(12) United States Patent
Delmerico et al.

(10) Patent No.: US 8,174,150 B2
(45) Date of Patent: May 8, 2012

(54) SYSTEM AND METHOD FOR CONTROL OF A GRID CONNECTED POWER GENERATING SYSTEM

(75) Inventors: Robert William Delmerico, Clifton Park, NY (US); Einar Vaughn Larsen, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/966,269

(22) Filed: Dec. 13, 2010

(65) Prior Publication Data
US 2011/0221280 A1 Sep. 15, 2011

(51) Int. Cl.
*H02J 1/00* (2006.01)
*G05F 3/06* (2006.01)
(52) U.S. Cl. .......................................... 307/69; 307/151
(58) Field of Classification Search .................... 307/69, 307/45, 151
See application file for complete search history.

(56) References Cited

U.S. PATENT DOCUMENTS

| 6,850,426 | B2 | 2/2005 | Kojori et al. | |
|---|---|---|---|---|
| 2009/0190380 | A1 | 7/2009 | Nangreaves et al. | |
| 2009/0257257 | A1 | 10/2009 | Adragna et al. | |
| 2010/0008119 | A1 | 1/2010 | O'Brien et al. | |
| 2011/0057444 | A1* | 3/2011 | Dai et al. | 290/44 |

* cited by examiner

*Primary Examiner* — Michael Rutland Wallis
(74) *Attorney, Agent, or Firm* — Ann M. Agosti

(57) ABSTRACT

A power generating system includes an energy source coupled to a DC link through a first power converter and a second power converter to couple the DC link to a power grid. A first controller in the power generating system regulates voltage on the DC link and a second controller regulates a parameter of the energy source. A dynamic parsing controller coupled to the first power converter and the second power converter selectively parses the output signals of the first and second controllers and generates operating commands for the first and second power converters based at least in part on the parsed output signals.

19 Claims, 5 Drawing Sheets

SYSTEM AND METHOD FOR CONTROL OF A GRID CONNECTED POWER GENERATING SYSTEM

BACKGROUND

The present invention relates generally to power generating systems connected to a grid and, more particularly, to control of a wind power generating system.

Wind turbine generators are regarded as environmentally friendly and relatively inexpensive alternative sources of energy that utilize wind energy to produce electrical power. A wind turbine generator generally includes a wind rotor having turbine blades that transform wind energy into rotational motion of a drive shaft, which in turn is utilized to drive a rotor of an electrical generator to produce electrical power. Modern wind power generation systems typically take the form of a wind-farm having multiple such wind turbine generators that are operable to supply power to a utility system.

Some wind turbine generators have a variable frequency operation and require a variable frequency power electronic converter to interface the wind turbine generator output with the utility grid. In one common approach, the wind turbine generator output is directly fed to a power electronic converter where the generator output frequency is rectified and inverted into a fixed frequency as needed by the utility system.

One of the challenges associated with such systems is control of wind turbines in the event of a weak and/or resonant grid connection. For example, to compensate for a weak grid connection use of series compensation, such as a series capacitor bank, is one means of increasing transmission capability in the grid, but this has potential limitation. Series compensation may lead to sub-synchronous resonance modes that can couple to the power electronic converter controllers causing control instability. Resonant mode coupling challenges may also occur at super synchronous frequencies due to the interaction of distributed shunt capacitance and line inductance in the network.

Therefore, it is desirable to determine a method and a system that will address the foregoing issues.

BRIEF DESCRIPTION

In accordance with an embodiment of the present invention, a power generation system including an energy source coupled to a DC link through a first power converter is provided. The power generation system also includes a second power converter for coupling the DC link to a power grid, a first controller for regulating voltage on the DC link and a second controller for regulating a parameter of the energy source. The system further includes a dynamic parsing controller coupled to the first power converter and the second power converter and configured to selectively parse the output signals of the first and second controllers and generate operating commands for the first and the second power converters based at least in part on the parsed output signals.

In accordance with another embodiment of the present invention, a control system for a wind power generating system including a wind turbine coupled to a DC link through a first power converter and a second power converter for coupling the DC link to a power grid is provided. The control system includes a DC link controller for regulating voltage on the DC link and a torque controller for regulating torque of the wind turbine. The control system further includes a dynamic parsing controller coupled to the first power converter and the second power converter and configured to selectively parse the output signals of the torque and DC link controllers and generate operating commands for the first and second power converters based at least in part on the parse output signals.

In accordance with yet another embodiment of the present invention, a method of supplying electrical power to a power grid is provided. The method includes generating the electrical power from an electrical source and coupling the electrical source to the power grid through a first power converter and a second power converter. The method also includes controlling the first and second power converters by interfacing output signals of a first controller configured to regulate voltage on the DC link and a second controller configured to regulate a parameter of the energy source.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention function to provide methods and systems to control grid connected power generating systems. Although the present discussion focuses on control of power electronic converters in a wind power generating system, the present invention is applicable to any power generating system with a dispatchable or intermittent input energy source and a power electronic converter interface. For example, the present invention is also applicable but not limited to solar power generation, marine hydrokinetic power generation, microturbines, and fuel cell systems.

Figure 1:
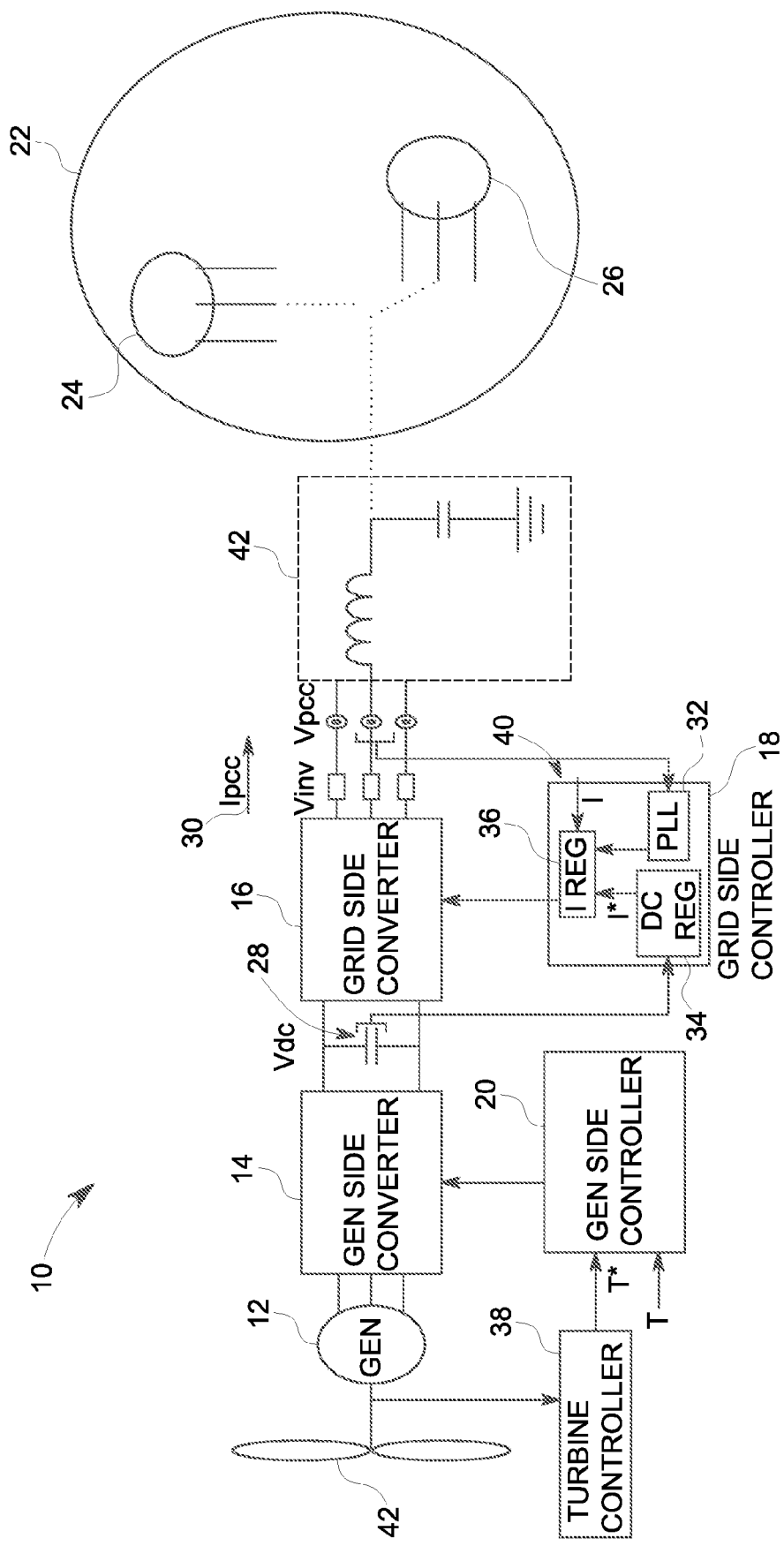
FIG. 1 is a diagrammatical representation of a conventional wind power generating system connected to a power grid.

FIG. 1 shows a conventional grid connected wind power generating system 10. The system includes a wind generator 12, a generator side converter 14, and a grid side converter 16. The system further includes a grid side controller 18, a generator side controller 20, and a power grid 22. Power grid 22 typically includes conventional synchronous generators 24 and electrical loads 26. A resonant circuit 42 is also formed in power grid 22. A direct current (DC) link 28 connects generator side converter 14 and grid side converter 16. Generator side converter 14 converts alternating current (AC) power generated by wind generator 12 into DC power. Grid side converter 16 then converts the DC power to AC power at a frequency compatible with power grid 22.

The combination of grid side controller 18 and grid side converter 16 functions as a current controlled source for grid 22. In other words, grid side controller 18 controls the phase and amplitude of the output current 30 of grid side converter 16 relative to the measured terminal voltage (Vpcc). In one embodiment, grid side controller 18 and grid side converter 16 may alternatively function as a voltage controlled source.

Grid side controller 18 typically includes a phase locked loop (PLL) 32, a DC voltage regulator 34, and an AC current regulator 36. PLL 32 senses three phase voltages of the power grid and generates a frequency and phase reference for grid side converter 16. DC voltage regulator 34 helps in maintaining the DC link voltage at a desired value. Current regulator 36 generates the output current reference for grid side converter 16 based on the PLL output and the DC voltage regulator output. Generator side controller 20 generates operating or switching signals for generator side converter 14. In one embodiment, a turbine controller 38 provides a torque reference to generator side controller 20 based on wind velocity or rotor speed of the wind turbine. The turbine controller generates the torque reference to maximize the energy captured from the wind.

Grid resonance modes can couple to grid side controller 18 through the voltage and current measurement signals. In some embodiments, the grid side control of DC voltage can be susceptible to interaction with weak grids or grid resonant modes. This interaction may occur due to the effect of weak or resonant grid conditions on the forward loop transfer function of the DC link voltage control. In another embodiment (not shown in FIG. 1) to overcome control instability problems caused by weak or resonant grid conditions, generator side converter 14 controls DC link voltage, grid side converter 16 controls wind turbine torque. However, this type of control may result in wind turbine torque instability due to the effect of weak or resonant grid conditions on the forward loop transfer function of the torque control.

Figure 2:
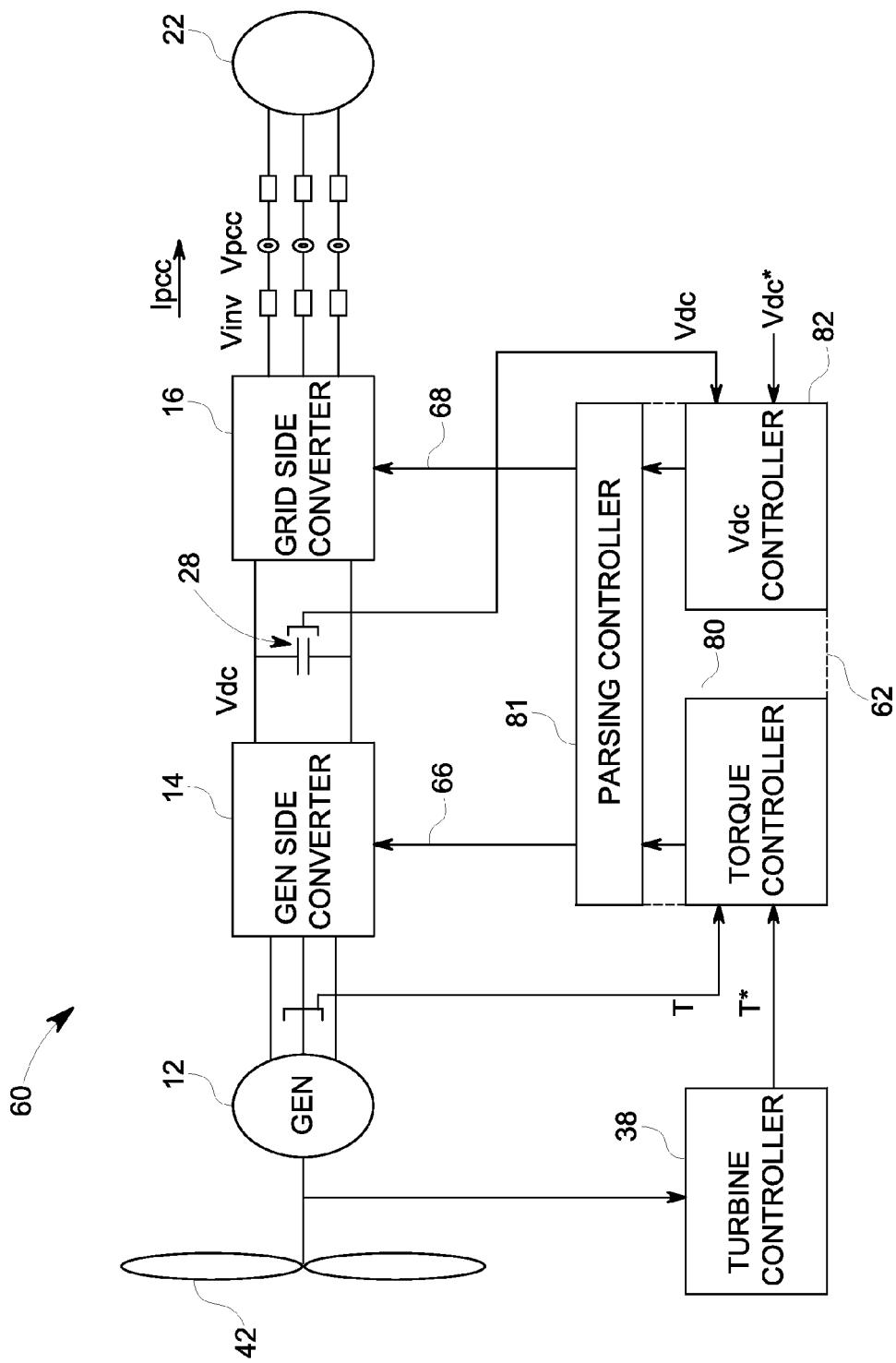
FIG. 2 is a diagrammatical representation of a grid connected wind power generating system, in accordance with an embodiment of the present invention.

FIG. 2 shows a grid connected wind power generating system 60 in accordance with an embodiment of the present invention. Power generating system 60 includes a unified controller 62 that coordinates the control of signals necessary for the transfer of power from the wind turbine generator 12 to the converter DC link 28 and power grid 22. The unified controller functions may include, but are not limited to, controlling output power, generator torque, generator speed, and DC link voltage. In one embodiment, unified controller 62 includes a torque controller 80 and a voltage controller 82. It should be noted that torque controller 80 may be replaced by or supplemented with other controllers to control parameters of generating systems such as active power, generator speed, or output current.

In one specific embodiment, unified controller 62 includes a coupled or a multivariable controller that receives torque reference command T*, torque feedback signal T, DC link voltage reference command Vdc*, and DC link voltage feedback signal Vdc. The controller 62 then provides control signals or switching commands 66 and 68 to generator side converter 14 and grid side converter 16, respectively. In one embodiment, the torque control and the DC link voltage control functions are split between generator side and grid side converters in a parsing controller 81 based on various strategies such as parsing the control signals based on frequency response or based on amplitudes, for example.

Figure 3:
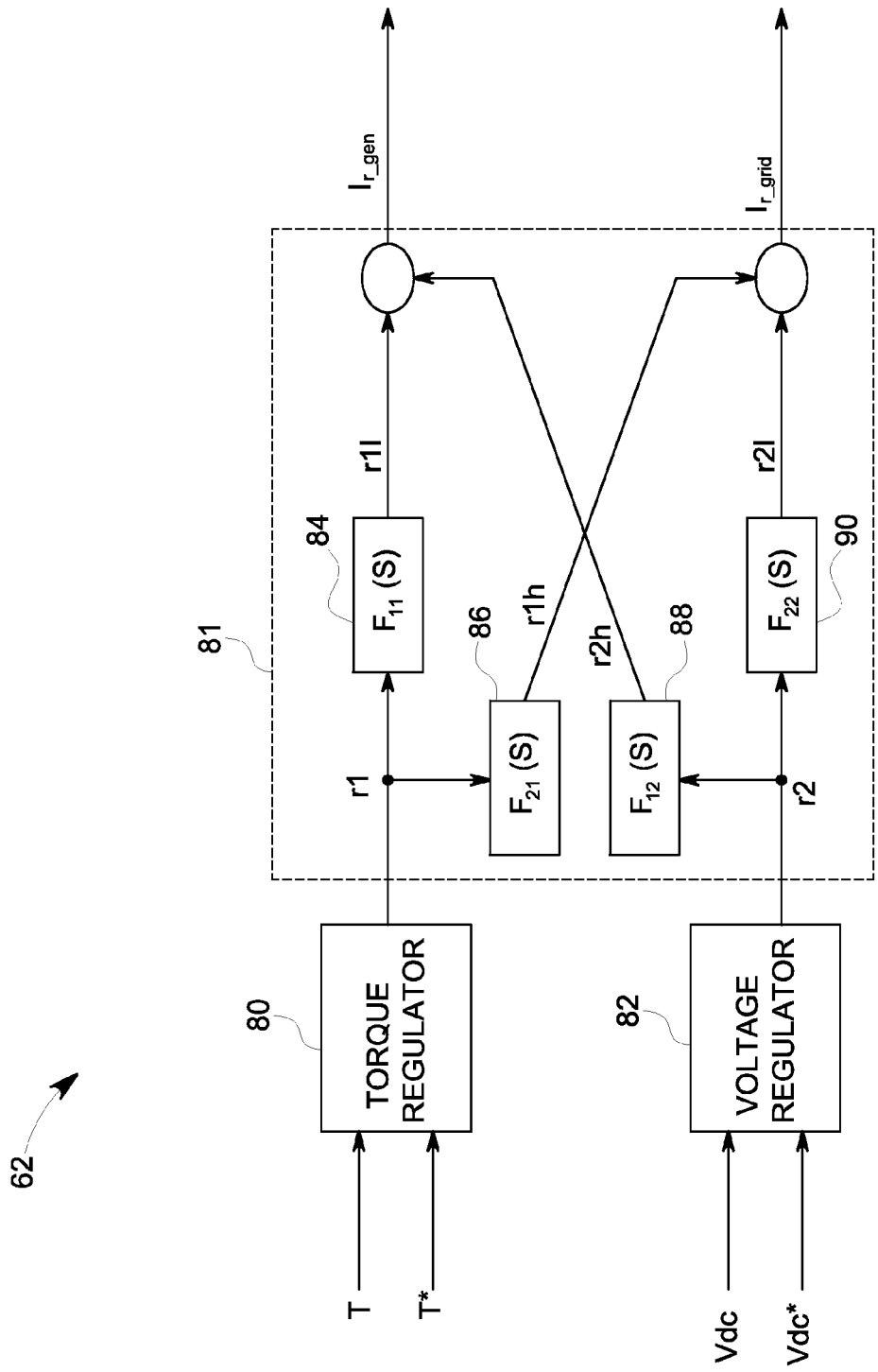
FIG. 3 is a diagrammatical representation of a detailed block diagram of an unified controller of FIG. 2, in accordance with an embodiment of the present invention.

FIG. 3 shows a detailed block diagram of the unified controller 62 of FIG. 2 in accordance with an embodiment of the present invention. Unified controller 62 includes torque controller 80, DC link voltage controller 82, and dynamic parsing controller 81. Both torque and DC link voltage controllers 80, 82 may comprise proportional-integral (PI) type controllers. Torque controller 80 receives the torque reference command T* and the torque feedback signal T and generates a torque control signal r1 based on a difference between T* and T.

Similarly, voltage controller 82 generates a voltage control signal r2 based on a difference between reference DC link voltage command Vdc* and DC link voltage feedback signal Vdc.

In one embodiment, dynamic parsing controller 81 includes function blocks 84, 86 for torque control and function blocks 88, 90 for voltage control to parse the torque and voltage control signals r1 and r2 between the generator side converter and the grid side converter in response to system dynamics. In this way, the control and disturbance response of the torque and DC link voltage signals will be improved. In one embodiment, function blocks 84, 86, 88, 90 may be dynamic, linear, or nonlinear scalar blocks, or combinations of these. Further, the parameters of the function blocks may be dynamically adjusted based on other control signals such as output power, generator speed, voltage magnitude, or current magnitude.

Function blocks 84, 86, 88, 90 may parse the torque and voltage control signals r1 and r2 based on any of a number of strategies. One strategy is to parse the signals based on frequency response such that high frequency and low frequency signals are separated. For example, the high frequency and low frequency signals may be defined by the operator and, in one embodiment, low frequency signals refer to signals of bandwidth lower than 5 or 10 Hz, and high frequency signals refer to signals with bandwidth higher than 5 or 10 Hz. The operator as used herein refers to an authorized person who controls the operation of a power generating system and has authority to control parameters of the controllers. In one embodiment function blocks 86 and 88 may comprise high pass filters, and function blocks 84 and 90 may comprise low pass filters. The transfer functions $F_{12}(s)$ and $F_{22}(s)$ of the function blocks 88, 90 for the DC-link voltage control may be given as $$F_{12}(s) = k_{11} \frac{Ts}{1+Ts} \quad (1)$$

$$F_{22}(s) = k_{21} \frac{1}{1+Ts} \quad (2)$$

where s is a Laplace operator, and T, $k_{11}$, and $k_{21}$ are constants determined based on network elements and network conditions such as power level, voltage and current magnitude, faults, or generator speed. In one embodiment, constants T, $k_{11}$, and $k_{21}$ are dynamic and may vary depending on system conditions. For example, T may comprise a time constant determined from the parsing frequency bandwidth selected. Thus, this implementation will parse control based on the frequency content of the voltage control signal. The high frequency content of the signal (freq>½πT) will be directed to the generator side converter 14, and the low frequency (e.g., steady-state) content will be directed to the grid side converter 16. Similar transfer functions may be used for control blocks 84 and 86 for controlling the torque. The frequency parsed signals r1h and r2h from the torque control signal and the voltage control signal are then combined to generate an active-current signal Ir_gen for the generator side converter 14. Further, frequency parsed signals r1h and r2l are combined to generate an active-current signal Ir_grid for the grid side converter 16.

In another embodiment, based on system conditions, function blocks 88, 90 for dc-link voltage control may be designed as below:

$$F_{12}(r_2) = \begin{cases} k_{11} \cdot (r_2 - F_{max}) & r_2 \geq F_{max} \\ 0 & F_{max} > r_2 > F_{min} \\ k_{11} \cdot (r_2 - F_{min}) & r_2 \leq F_{min} \end{cases} \quad (3)$$

$$F_{22}(r_2) = \begin{cases} k_{11} \cdot F_{max} & r_2 \geq F_{max} \\ k_{11} \cdot r_2 & F_{max} > r_2 > F_{min} \\ k_{11} \cdot F_{min} & r_2 \leq F_{min} \end{cases} \quad (4)$$

This implementation will parse control signals based on the amplitude of the torque control signal r1 and voltage control signal r2. For example, signals between $F_{max}$ and $F_{min}$ will affect only the grid side converter, while signals outside of $F_{max}$ and $F_{min}$ will affect the gen side converter. $F_{max}$ and $F_{min}$ are again dynamic constants and are determined based on network elements and network conditions such as power level, voltage and current magnitude, faults, and generator speed.

It should be noted that the implementations of function blocks 84, 86, 88, and 90 given in equations 1, 2, 3, and 4 are just for exemplary purposes and in one embodiment, function block 84 may have unity gain, function block 86 may have zero gain, function block 88 may be a high pass filter and function block 90 may be a low pass filter. Similarly in another embodiment, function blocks 84, 86 may parse the signal based on frequency response whereas function blocks 88, 90 may parse the signal based on amplitude of the control signal. In yet another embodiment, where a third converter with an energy storage device or a load and a respective controller is used in the system, the control signals may be parsed in three different components. Thus, various different combinations may be used for implementation of function blocks 84, 86, 88, and 90.

Figure 4:
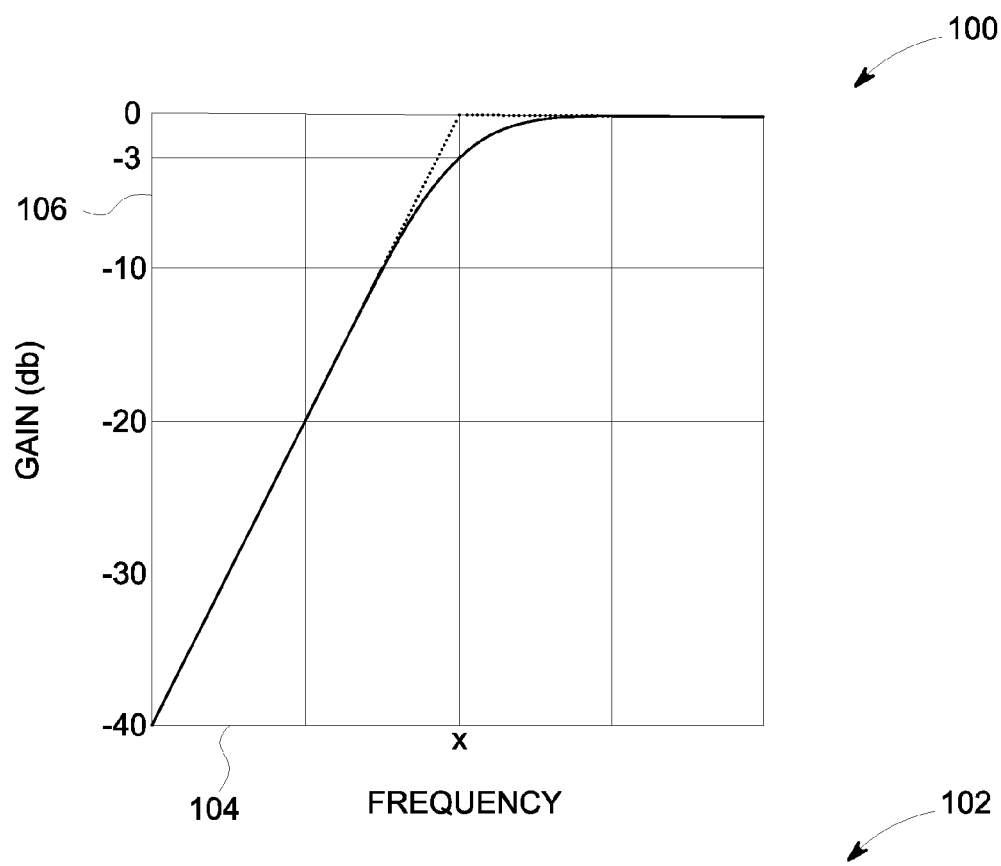
FIG. 4 is graphical representation of frequency responses of function blocks of FIG. 3.
Figure 4:
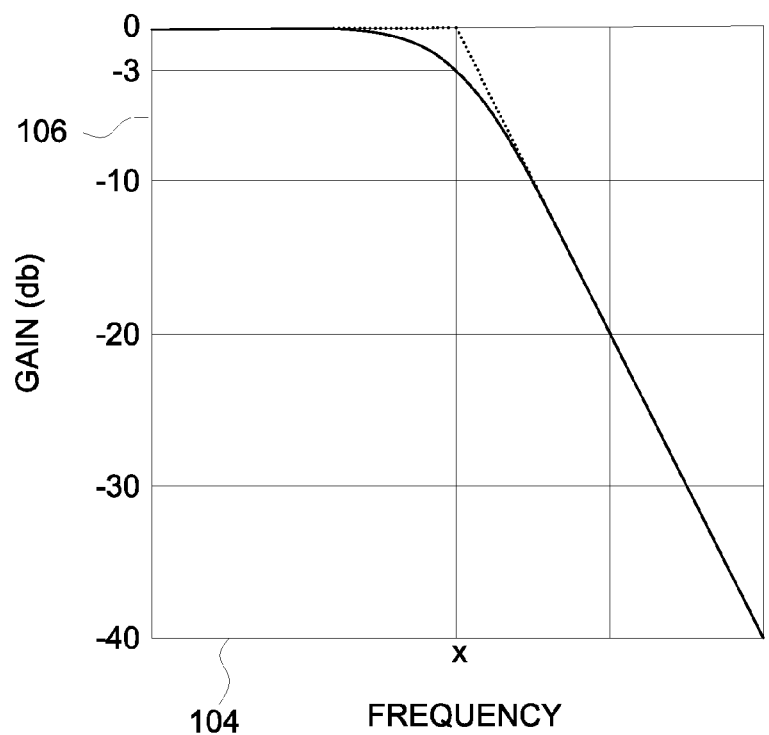

FIG. 4 shows simulated frequency responses 100 and 102 of function blocks 84 and 86 or 88 and 90 in accordance with an embodiment of the present invention. In both responses 100, 102, horizontal axis 104 represents frequency in Hz, and vertical axis 106 represents amplitude gain in decibel (db). It can be seen from response 100 that below a frequency of x Hz the amplitude gain is below 3 db, and beyond that the amplitude gain is 0 db. On the contrary, for response 102, the amplitude gain is below 3 db for frequencies above x Hz. Thus, the function blocks 84 and 86 or 88 and 90 parse the control signals between two frequencies and control the grid side converter and the generator side converter. It should be noted that the frequency x Hz may be determined by the operator, and in one embodiment it may be 5 Hz or 10 Hz. In another embodiment, the frequency is determined based on the sub synchronous resonance frequency.

Figure 5:
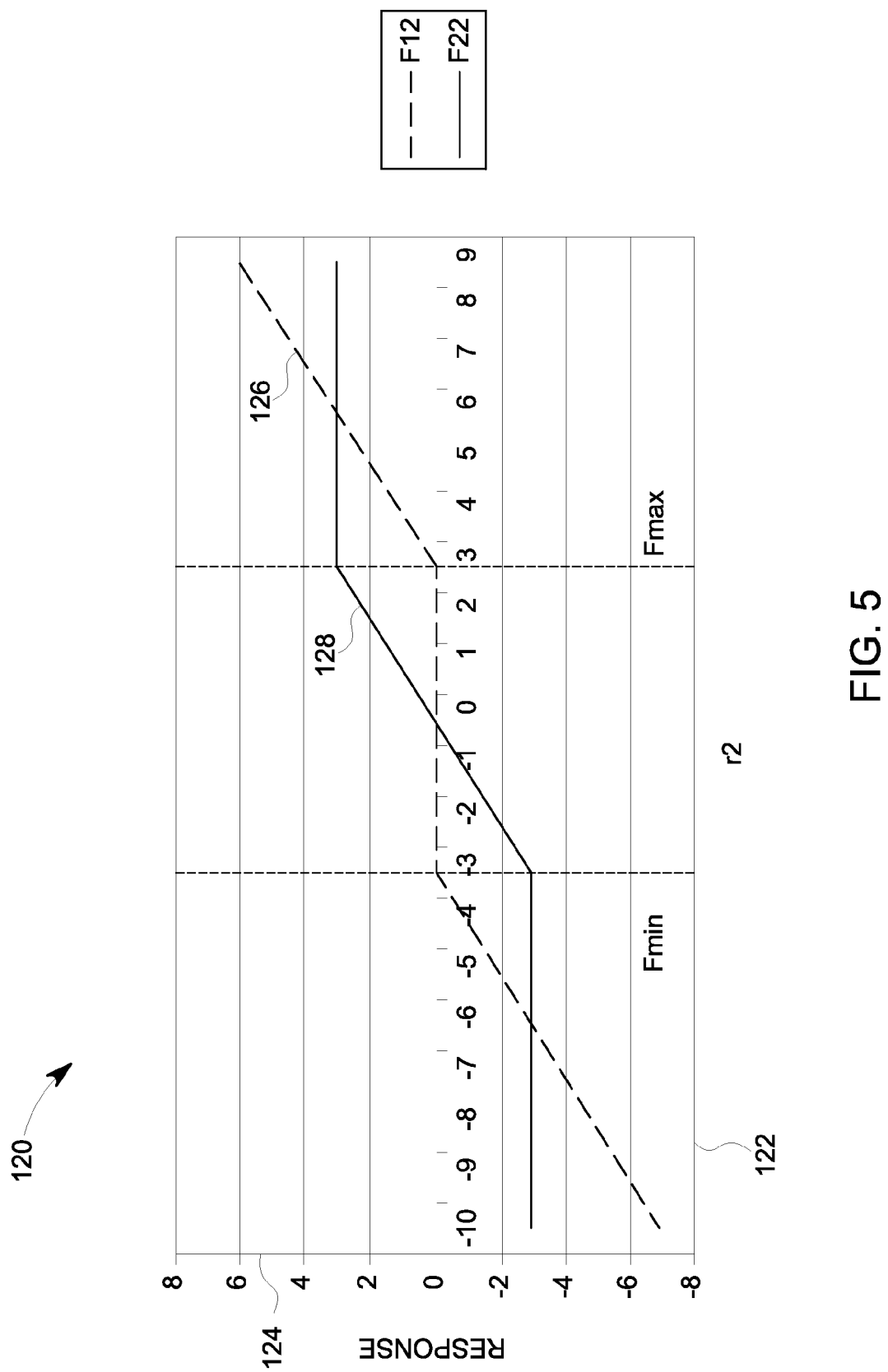
FIG. 5 is graphical representation of an amplitude response plot of function blocks of FIG. 3.

FIG. 5 shows a simulated amplitude response plot 120 of function blocks 88, 90 for the implementation described in equations (3) and (4). In plot 120, horizontal axis 122 represents the amplitude of voltage control signal r2, and vertical axis 124 represents the amplitude of response signals r2h and r2l. Plot 126 represents response signal r2h of function block 88, and plot 128 represents response signal r2l of function block 90 respectively. It can be seen from plots 126 and 128 that the voltage control signal r2 is parsed based on a lower cut off amplitude Fmin and a upper cut off amplitude Fmax as described in equations (3) and (4).

One of the advantages of the present control system is that it can provide a more stable control behavior for weak or resonant grid networks by dynamically directing the control signals to the more stable converter platform, depending on system conditions. As will be appreciated by those of ordinary skill in the art, even though the above discussion focuses on wind power generating system, the control method can also be used in other uncontrollable power generating systems connected to the power grid such as photovoltaic, microturbines, marine hydrokinetic, and fuel cell systems. In such power generating systems, the grid side and the generator side converter controls may be implemented as a coupled or multivariable control. Similarly, even though the discussion focuses on parsing the signals in two components, in certain embodiments where more than two power converters or two controllers are utilized, the control method may also split the control signal in more than two components. Further, torque control and DC-link voltage control can be split between the generator side and the grid side based on several strategies.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generating system comprising
an energy source coupled to a DC link through a first power converter;
a second power converter for coupling the DC link to a power grid;
a first controller configured to regulate voltage on the DC-link;
a second controller configured to regulate a parameter of the energy source;
a dynamic parsing controller coupled to the first power converter and the second power converter and configured to selectively parse the output signals of the first and second controllers and generate operating commands for the first and second power converters based at least in part on the parsed output signals.

2. The system of claim 1, wherein the energy source comprises at least one of a wind turbine, photovoltaic module, microturbine, marine hydrokinetic energy device, or fuel cell.

3. The system of claim 1, wherein the parameter of the energy source comprises at least one of an active power, generator torque, output current, or generator speed.

4. The system of claim 1, wherein the dynamic parsing controller comprises a single multivariable controller.

5. The system of claim 1, wherein the dynamic parsing controller comprises function blocks configured to parse output signals of the first controller and the second controller.

6. The system of claim 5, wherein the function blocks parse output signals based on frequency response, amplitudes, or combinations thereof.

7. The system of claim 5, wherein function blocks comprise dynamic functions, linear functions, nonlinear functions, or combinations thereof.

8. The system of claim 7, wherein parameters of function blocks are based on at least one of a network condition, output power, voltage magnitude, current magnitude, or generator speed.

9. The system of claim 5, wherein function blocks comprise a high pass filter and a low pass filter for parsing the output signals into high frequency and low frequency components.

10. The system of claim 9, wherein frequencies for high pass filter and low pass filters are determined by a system operator.

11. The system of claim 9, wherein the low frequency component comprises signals below 10 Hz and the high frequency component comprises signals above 10 Hz.

12. A control system for a wind power generating system comprising a wind turbine coupled to a DC link through a first power converter and a second power converter for coupling the DC link to a power grid, the control system comprising:
- a DC link controller configured to regulate voltage on the DC-link;
- a torque controller configured to regulate torque of the wind turbine;
- a dynamic parsing controller coupled to the first power converter and the second power converter and configured to selectively parse the output signals of the torque and DC link controllers and generate operating commands for the first and second power converters based at least in part on the parsed output signals.

13. The control system of claim 12 wherein the dynamic parsing controller is configured so as to send operating commands to both the first and second power converters to regulate the voltage on the DC-link.

14. The control system of claim 12 wherein the dynamic parsing controller is configured so as to send operating commands to both the first and second power converters to regulate the torque of the wind turbine.

15. The control system of claim 12, wherein the dynamic parsing controller comprises function blocks configured to parse output signals of the first controller and the second controller.

16. The control system of claim 15, wherein the function blocks parse output signals based on frequency of output signals, amplitudes of output signals, or combinations thereof.

17. The control system of claim 15, wherein parameters of function blocks are based on at least one of a network condition, output power, voltage magnitude, current magnitude, or generator speed.

18. A method of supplying electrical power to a power grid comprising:
- generating the electrical power from an energy source;
- coupling the energy source to the power grid through a first power converter and a second power converter;
- controlling the first and second power converters by interfacing output signals of a first controller configured to regulate voltage on the DC-link and a second controller configured to regulate a parameter of the energy source wherein interfacing output signals comprises parsing output signal based on frequency response, amplitude or combinations thereof.

19. The method of claim 18, wherein the output signals are parsed in a high frequency component and a low frequency component.

* * * * *